W. F. HAGEN & W. F. BUDENBACH.
CUSPIDOR.
APPLICATION FILED MAR. 6, 1913.

1,129,976.

Patented Mar. 2, 1915.

Witnesses
M. S. Watson
Henry T. Bright

Inventors
W. F. Hagen
W. F. Budenbach
By
Attorneys

UNITED STATES PATENT OFFICE.

WILLIAM F. HAGEN AND WILLIAM F. BUDENBACH, OF SCRANTON, PENNSYLVANIA.

CUSPIDOR.

1,129,976.  Specification of Letters Patent.  Patented Mar. 2, 1915.

Application filed March 6, 1913. Serial No. 752,455.

*To all whom it may concern:*

Be it known that we, WILLIAM F. HAGEN and WILLIAM F. BUDENBACH, citizens of the United States, residing at Scranton, in the county of Lackawanna, State of Pennsylvania, have invented certain new and useful Improvements in Cuspidors; and we do hereby declare the following to be a full, clear, and exact description of the invention, such as will enable others skilled in the art to which it appertains to make and use the same.

This invention relates to cuspidors.

The object of the invention resides in the provision of a cuspidor which will be highly sanitary in use, easily cleaned, and which may be manufactured at a very low cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
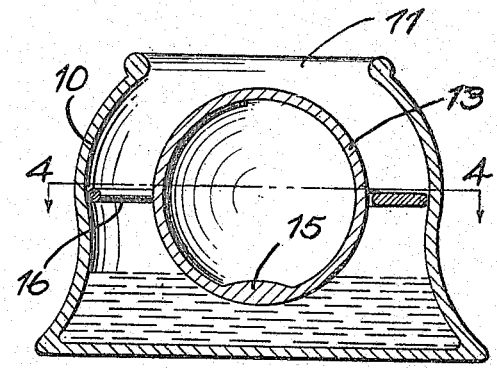
Figure 2:
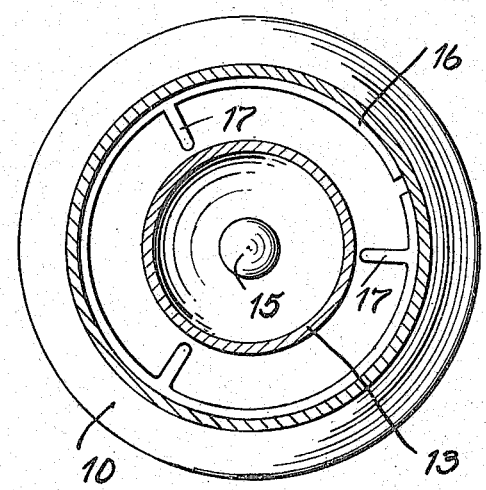

Figure 1 is a vertical section of a cuspidor constructed in accordance with the invention, and Fig. 2, a section on the line 4—4 of Fig. 1.

In the drawings the cuspidor is shown as comprising a receptacle 10 adapted to hold a predetermined quantity of water when the cuspidor is in use. This receptacle 10 is provided with a mouth 11. Disposed within the receptacle 10 is a split ring 16 which has projecting from its inner edge a plurality of fingers 17. Also disposed within the receptacle 10 is a buoyant hollow spherical member 13 which is supported by the water in the receptacle when the cuspidor is in use. This member 13 is provided with a slightly weighted portion 15 which will always be disposed under normal condition to the bottom of the receptacle. It will be understood however that any foreign matter deposited upon the member 15 will possess more than sufficient weight to rotate the member 13 against the influence of the weighted portion 15. The fingers 17 serve to hold the member 13 centered as will be obvious. By constructing the centering fingers integral with a split ring it will be apparent that both the ring and the fingers can be readily removed by simply contracting the ring sufficiently to permit the passage thereof through the mouth of the receptacle.

What we claim is:—

A cuspidor comprising a receptacle having a mouth, a buoyant spherical member disposed within said receptacle and adapted to be supported by a predetermined quantity of water within the receptacle, a split ring disposed within the receptacle and frictionally engaging the inner wall thereof above the bottom of the receptacle, a plurality of fingers formed on the ring and extending inwardly of the receptacle for holding the spherical members centered with respect to the mouth of the receptacle when same is dispoesd out of engagement with the edge of the mouth and supported by water within the receptacle.

In testimony whereof, we affix our signatures, in the presence of two witnesses.

WILLIAM F. HAGEN.
WILLIAM F. BUDENBACH.

Witnesses:
G. U. HUBER,
JOHN F. HILDEBRAND.

Copies of this patent may be obtained for five cents each, by addressing the "Commissioner of Patents, Washington, D. C."